(12) United States Patent
Liu

(10) Patent No.: US 11,678,699 B2
(45) Date of Patent: Jun. 20, 2023

(54) BATTERY ASSEMBLY HAVING BUTTON FOR ACTIVATING OR LOCKING THE CELL

(71) Applicant: Shenzhen Eigate Technology Co., Ltd., Shenzhen (CN)

(72) Inventor: Tuanfang Liu, Shenzhen (CN)

(73) Assignee: ASPIRE NORTH AMERICA LLC

( * ) Notice: Subject to any disclaimer, the term of this patent is extended or adjusted under 35 U.S.C. 154(b) by 290 days.

(21) Appl. No.: 17/022,047

(22) Filed: Sep. 15, 2020

(65) Prior Publication Data
US 2021/0212365 A1 Jul. 15, 2021

(30) Foreign Application Priority Data
Jan. 15, 2020 (CN) .......................... 202020087577.1

(51) Int. Cl.
*A24F 13/00* (2006.01)
*A24F 40/40* (2020.01)
*A24F 40/95* (2020.01)
*H01M 50/216* (2021.01)

(52) U.S. Cl.
CPC .............. *A24F 40/40* (2020.01); *A24F 40/95* (2020.01); *H01M 50/216* (2021.01)

(58) Field of Classification Search
CPC ........................................................ A24F 47/00
USPC ................................................... 131/328–329
See application file for complete search history.

(56) References Cited

U.S. PATENT DOCUMENTS

2020/0359707 A1\* 11/2020 Liu .......................... A24F 40/20
2021/0030980 A1\* 2/2021 Liu .......................... A24F 40/40
2021/0282462 A1\* 9/2021 Qiu .......................... A24F 40/46

\* cited by examiner

*Primary Examiner* — Phuong K Dinh
(74) *Attorney, Agent, or Firm* — Matthias Scholl P.C.; Matthias Scholl

(57) ABSTRACT

A battery assembly, including a button, a support, a control panel, a silicone cap, a silicone insulator, and a USB panel. The output end of the cell is soldered on the input end of the control panel. The USB panel is soldered on the control panel to charge the cell. The silicone insulator is disposed on the top end of the cell. The silicone cap is disposed on a power switch of the control panel. The support is transparent and disposed on the control panel to fix the button. The button is disposed on the support.

2 Claims, 3 Drawing Sheets

BATTERY ASSEMBLY HAVING BUTTON FOR ACTIVATING OR LOCKING THE CELL

CROSS-REFERENCE TO RELATED APPLICATIONS

Pursuant to 35 U.S.C. § 119 and the Paris Convention Treaty, this application claims foreign priority to Chinese Patent Application No. 202020087577.1 filed Jan. 15, 2020, the contents of which, including any intervening amendments thereto, are incorporated herein by reference. Inquiries from the public to applicants or assignees concerning this document or the related applications should be directed to: Matthias Scholl P. C., Attn.: Dr. Matthias Scholl Esq., 245 First Street, 18th Floor, Cambridge, Mass. 02142.

BACKGROUND

The disclosure relates to a battery assembly.

A conventional electronic cigarette includes a battery assembly and a pneumatic switch. When an airflow passes through the pneumatic switch, the battery assembly is triggered to supply power to the control panel. However, the battery assembly may be triggered by an unexpected airflow.

SUMMARY

The disclosure provides a cell, a battery assembly, comprising a button, a support, a control panel, a silicone cap, a silicone insulator, and a USB panel; wherein an output end of the cell is soldered on an input end of the control panel; the USB panel is soldered on the control panel to charge the cell; the silicone insulator is disposed on a top end of the cell; the silicone cap is disposed on a power switch of the control panel; the support is transparent and disposed on the control panel to fix the button; the button is disposed on the support, and is adapted to be pressed to push on the silicone cap to operate the power switch of the control panel.

In a class of this embodiment, pressing and holding the button, the cell starts to work and supplies power to the control panel; continuously pressing the button five times again, the cell is locked and no power is output.

In a class of this embodiment, the control panel comprises an LED light; when the button is pressed five times continuously, the LED light on the control panel emits a white light passing through the support, indicating that the battery is in a power on or off state; when the battery starts to work after pressing and holding the button, a bright blue light indicates that the cell is in fully charged state, a green light indicates that 50% power of the cell is consumed, and a red light indicates the cell is in a state of power shortage.

In a class of this embodiment, the control panel comprises an LED light; when the button is pressed five times continuously, the LED light on the control panel emits a white light passing through the support, indicating that the battery is in a power on or off state; when the battery starts to work after pressing and holding the button, a bright blue light indicates that the cell is in fully charged state, a green light indicates that 50% power of the cell is consumed, and a red light indicates the cell is in a state of power shortage.

In use, after continuously pressing the button five times, the cell is activated or locked; pressing and holding the button, the cell starts to work and supplies power to the control panel; continuously pressing the button five times again, the cell is locked and no power is output. This saves the power.

DETAILED DESCRIPTION

To further illustrate, embodiments detailing a battery assembly are described below. It should be noted that the following embodiments are intended to describe and not to limit the disclosure.

Figure 1:
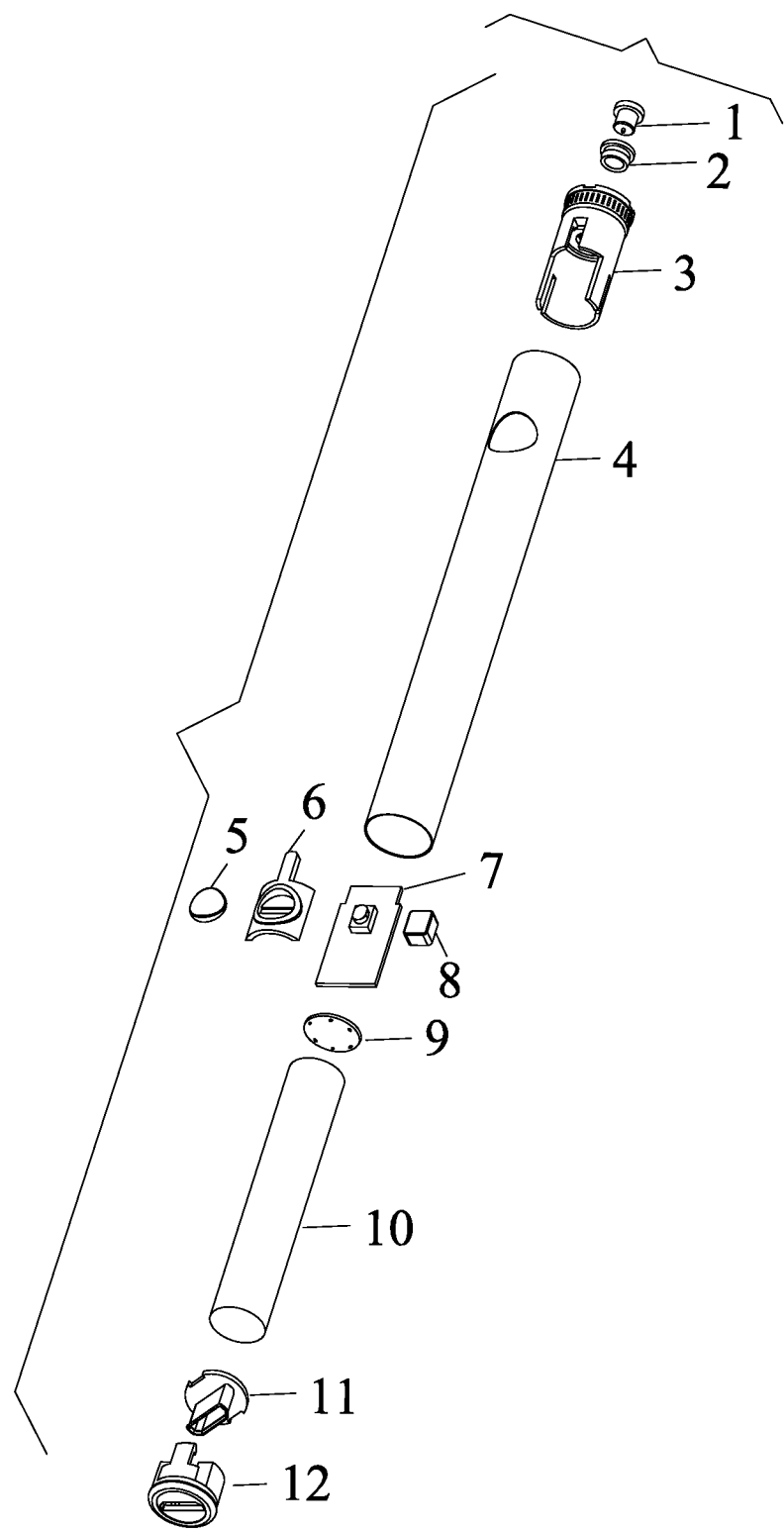
FIG. 1 is an exploded view of a battery assembly according to one embodiment of the disclosure.
Figure 2:
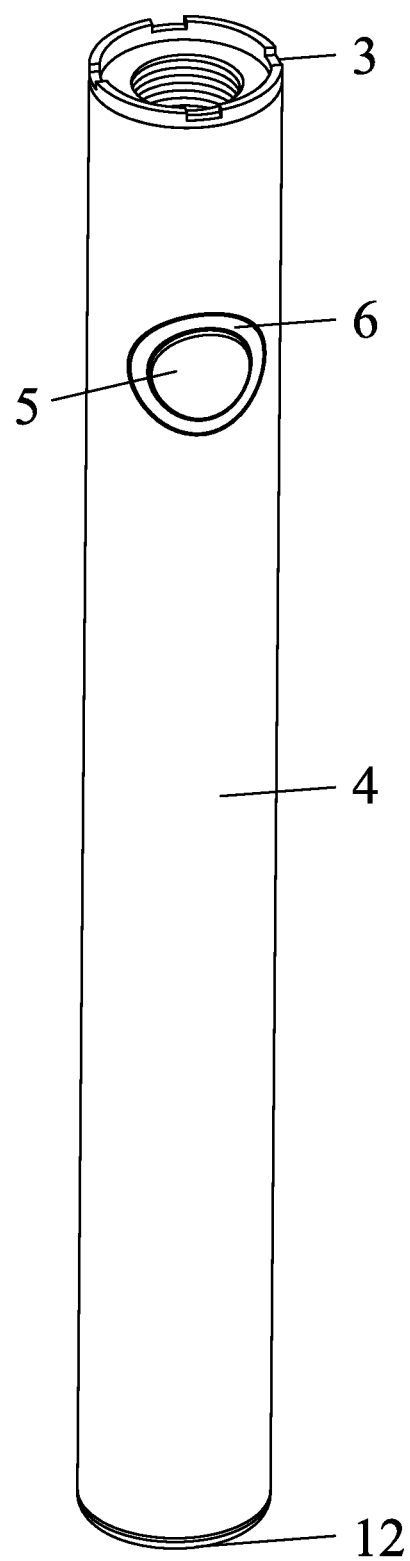
FIG. 2 is a schematic diagram of a battery assembly according to one embodiment of the disclosure.
Figure 3:
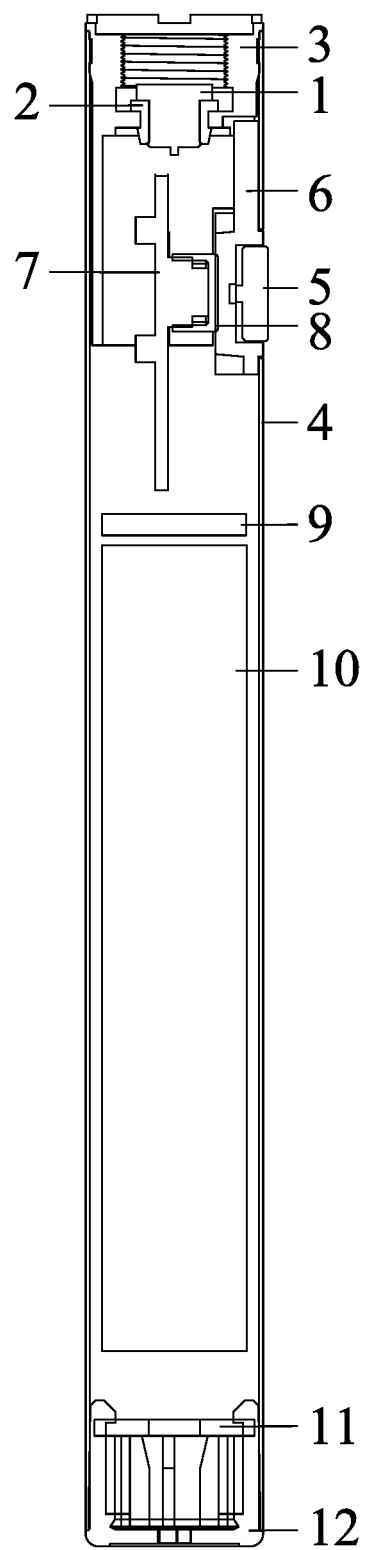
FIG. 3 is a sectional view of a battery assembly according to one embodiment of the disclosure.

As shown in FIGS. 1-3, a battery comprises an electrode 1, a silicone ring 2, a copper threaded ring 3, a battery rod 4, a button 5, a support 6, a control panel 7, a silicone cap 8, a silicone insulator 9, a USB panel 11, and a bottom cover 12. The silicone ring 2 is disposed in the copper threaded ring 3. The electrode 1 is disposed in the silicone ring 2. The control panel 7 is disposed in the copper threaded ring 3. The battery comprises a cell 10; an output end of the cell 10 is soldered on an input end of the control panel 7; the USB panel 11 is soldered on the control panel 7 to charge the cell 10; the silicone insulator 9 is disposed on a top end of the cell 10; the silicone cap 8 is disposed on a power switch of the control panel 7; the support 6 is transparent and disposed on the control panel 7 to fix the button 5; the button 5 is disposed on the support 6, and is adapted to be pressed to push on the silicone cap 8 to operate the power switch of the control panel 7. Continuously pressing the button 5 five times, the cell 10 is activated. The copper threaded ring 3 is disposed on the top end of the battery rod 4. The USB panel 11 is disposed on the bottom cover 12. The bottom cover 12 is disposed on the bottom end of the battery rod 4.

The following advantages are associated with the battery assembly of the disclosure:

1. The battery assembly has the function of signal indication, which can indicate the power state and working state of the battery to the user according to the color of the light.

2. In use, after continuously pressing the button five times, the cell is activated or locked; pressing and holding the button, the cell starts to work and supplies power to the control panel; continuously pressing the button five times again, the cell is locked and no power is output. This saves the power.

It will be obvious to those skilled in the art that changes and modifications may be made, and therefore, the aim in the appended claims is to cover all such changes and modifications.

What is claimed is:

1. A battery assembly, comprising a cell, a button, a support, a control panel, a silicone cap, a silicone insulator, and a USB panel; wherein an output end of the cell is soldered on an input end of the control panel; the USB panel is soldered on the control panel to charge the cell; the silicone insulator is disposed on a top end of the cell; the silicone cap is disposed on a power switch of the control panel; the support is transparent and disposed on the control panel to fix the button; the button is disposed on the support, and is adapted to be pressed to push on the silicone cap to operate the power switch of the control panel.

2. The battery assembly of claim 1, wherein pressing and holding the button, the cell starts to work and supplies power to the control panel; continuously pressing the button five times again, the cell is locked and no power is output.

\* \* \* \* \*